US012742855B2

(12) United States Patent
Lee et al.

(10) Patent No.: US 12,742,855 B2
(45) Date of Patent: Sep. 22, 2026

(54) DEVICE AND METHOD FOR PROCESSING RADAR SIGNAL, AND RADAR SYSTEM INCLUDING THE SAME

(71) Applicant: HL KLEMOVE CORP., Incheon (KR)

(72) Inventors: Jingu Lee, Incheon (KR); Junghwan Choi, Incheon (KR)

(73) Assignee: HL KLEMOVE CORP., Incheon (KR)

(*) Notice: Subject to any disclaimer, the term of this patent is extended or adjusted under 35 U.S.C. 154(b) by 272 days.

(21) Appl. No.: 18/619,216

(22) Filed: Mar. 28, 2024

(65) Prior Publication Data

US 2024/0329199 A1 Oct. 3, 2024

(30) Foreign Application Priority Data

Apr. 3, 2023 (KR) ........................ 10-2023-0043431

(51) Int. Cl.
*G01S 7/35* (2006.01)
*G01S 13/58* (2006.01)

(52) U.S. Cl.
CPC .............. *G01S 7/354* (2013.01); *G01S 7/356* (2021.05); *G01S 13/584* (2013.01)

(58) Field of Classification Search
CPC ........ G01S 7/354; G01S 7/356; G01S 13/584; G01S 13/12; G01S 13/426; G01S 13/536; G01S 13/538; G01S 13/343; G01S 13/42; G01S 13/931; G01S 7/41; G01S 13/02; G01S 7/2883; G01S 7/282; G01S 7/2927; G01S 13/003; G01S 13/581; B60W 2420/408
See application file for complete search history.

(56) References Cited

U.S. PATENT DOCUMENTS

| | | | |
|---|---|---|---|
| 10,222,470 B2 * | 3/2019 | Addison | ............... G01S 13/931 |
| 2021/0011147 A1 | 1/2021 | Va et al. | |
| 2021/0333386 A1 | 10/2021 | Park et al. | |
| 2022/0099795 A1 | 3/2022 | Crouch et al. | |
| 2022/0268924 A1 | 8/2022 | Choi et al. | |

FOREIGN PATENT DOCUMENTS

| | | |
|---|---|---|
| KR | 10-2212109 | 2/2021 |
| KR | 10-2022-0031005 | 3/2022 |

OTHER PUBLICATIONS

Office Action dated Jul. 11, 2025 for Korean Patent Application No. 10-2023-0043431 and its English translation provided by Applicant's foreign counsel.

* cited by examiner

*Primary Examiner* — Resha Desai
*Assistant Examiner* — Naomi M Wolford
(74) *Attorney, Agent, or Firm* — WOMBLE BOND DICKINSON (US) LLP

(57) ABSTRACT

A device for processing a radar signal may include a pre-acquisition unit configured to, during a first period within one scan period, perform two fast Fourier transforms (FFTs) on a first signal, perform digital beamforming or non-coherent integration and peak extraction, and determine a bin-rejection mask based on extracted peaks, and a normal-acquisition unit configured to, during a second period longer than the first period after the first period within the scan period, perform two FFTs on a second signal different from the first signal, perform digital beamforming or non-coherent integration and peak extraction, determine a Doppler component of a target, determine a virtual channel vector, and acquire information on the target based on the virtual channel vector.

20 Claims, 17 Drawing Sheets

FIG. 4

Doppler

Range

2D FFT

CFAR & Local Max

Merging

Bin rejection mask 1 2 3 4 5 6

BPM

DEVICE AND METHOD FOR PROCESSING RADAR SIGNAL, AND RADAR SYSTEM INCLUDING THE SAME

CROSS REFERENCE TO RELATED APPLICATION

This application claims benefit from and priority to Korean Patent Application No. 10-2023-0043431, filed on Apr. 3, 2023, which is hereby incorporated by reference for all purposes as if fully set forth herein.

TECHNICAL FIELD

The present disclosure generally relate to a device and method for a radar signal, and a radar system including the same. More specifically, some embodiments of the present disclosure relate to a device and method for precessing a radar signal, and a radar device including the same which are capable of performing a pre-acquisition function for increasing memory efficiency and a normal-acquisition function for resolving Doppler ambiguity, and a radar device including the same.

BACKGROUND

A driver assistance system (DAS) may need to acquire accurate information related to one or more targets or objects around a vehicle. A plurality of vehicle sensors may be used to implement such a DAS function, and a vehicle radar device is used for the DAS as one of the plurality of vehicle sensors.

Meanwhile, a camera sensor, among vehicle sensors, has an advantage of being able to obtain accurate target information, but the use of the camera is limited depending on a climatic environment such as nighttime or fog.

However, a vehicle radar sensor can be widely used as a vehicle sensor in that there is relatively no limitation due to nighttime or weather conditions in comparison with the camera sensor.

A radar device mounted in or to the vehicle may transmit a radar signal, which is an electromagnetic wave having a specific frequency, receive a signal reflected from an object, and then process the reception signal (i.e. the reflected signal) to acquire information related to the object such as the location or speed information of the object.

A vehicle radar device may include one or more transmission antennas and one or more reception antennas, and may acquire target or object information such as an estimation angle (e.g. azimuth or elevation angle) of the target or object, distance, and relative speed from a synthesized signal of a transmission signal and a reception signal reflected from the target or object.

In general, the radar device may perform a preprocessing function and a signal processing function to extract data from transmission signals and reception signals.

Since a lot of computational data is obtained during the preprocessing and signal processing processes, high memory capacity may be required.

In addition, unlike a single-input multi-output (SIMO) type radar device using a single transmission antenna, a multi-input multi-output (MIMO) type radar device using two or more transmission antennas needs to distinguish signals corresponding to each of the multiple transmission antennas, and therefore it may result in inaccurate information on the target's velocity component.

This inaccuracy in velocity components may be referred as a Doppler ambiguity.

If the Doppler ambiguity occurs in the radar signal processing process, it is difficult to generate a precise virtual channel vector, and as a result, there may be difficult to accurately estimate the angle of the target or object.

Therefore, in certain embodiments of the present disclosure, there is proposed a device, method, and system which enable acquisition of more precise target information by increasing memory efficiency and reducing the Doppler ambiguity even in the MIMO radar device.

SUMMARY

An object of some embodiments of the present disclosure is to provide a device and method for processing a radar signal and a radar system including the same which are capable of acquiring precise target or object information by increasing the memory efficiency of a radar device and reducing Doppler ambiguity.

Another object of certain embodiments of the present disclosure is to provide a device and method for processing a radar signal in which memory capacity for processing the radar signal may be reduced by a pre-acquisition processing function or operation for creating a bin-rejection mask to exclude range sections without velocity components.

Still another object of some embodiments of the present disclosure is to provide a device and method for processing a radar signal which may perform accurate target angle estimation and reduce Doppler ambiguity by including a normal-acquisition processing function or operation for changing a pulse-repetition interval (PRI) within one scan period.

In accordance with an aspect of the present disclosure, there may be provided a radar signal processing device including a pre-acquisition unit configured to, during a first period within a scan period, perform two fast Fourier transforms (FFTs) on a first signal, perform digital beamforming or non-coherent integration and peak extraction, and determine a bin-rejection mask based on extracted peaks, and a normal-acquisition unit configured to, during a second period longer than the first period after the first period within the scan period, perform two fast Fourier transforms (FFT) on a second signal different from the first signal, perform digital beamforming or non-coherent integration and peak extraction, determine a Doppler component of a target, determine a virtual channel vector, and acquire information on the target based on the virtual channel vector.

In this case, the second signal may have a second pulse-repetition interval which is different from a first pulse-repetition interval of the first signal.

The bin-rejection mask may represent a range section in which the Doppler component of the target exists.

The first signal and the second signal may be an intermediate frequency signal acquired by mixing a first transmission signal and a second transmission signal transmitted from a first transmission antenna and a second transmission antenna, respectively, and a first reception signal and a second reception signal reflected from the target and received from a plurality of receiving antennas.

In this case, the first transmission signal and the second transmission signal may be sequentially transmitted by time-division multiplexing, or may be signals modulated differently by binary phase modulation.

The normal-acquisition unit may use the bin-rejection mask to select and store only data in a range having a Doppler component for each of Mn chirp signals included in the second period.

The first transmission signal and the second transmission signal may be up-chirp signals, and the number Mp of up-chirp signals during the first period may be smaller than the number Mn of up-chirp signals during the second period.

The two fast Fourier transforms (FFTs) may include a range FFT and a Doppler FFT. In this case, the range FFT during the first period may have a first size N, and the range FFT during the second period may have a second size K smaller than the first size N.

The second size K may be a size of a pass-bin determined based on the bin-rejection mask.

In accordance with another aspect of the present disclosure, there may be provided a radar signal processing method including a pre-acquisition step performed during a first period within one scan period, and a normal-acquisition step performed during a second period longer than the first period after the first period within one scan period.

In this case, the pre-acquisition step may include performing two fast Fourier transforms (FFTs) on a first signal, performing digital beamforming or non-coherent integration and peak extraction, and determining a bin-rejection mask based on extracted peaks.

In addition, the normal-acquisition step may include performing two fast Fourier transforms (FFT) on a second signal different from the first signal, performing digital beamforming or non-coherent integration and peak extraction, determining a Doppler component of a target, determining a virtual channel vector, and acquiring information on the target based on the virtual channel vector.

In accordance with another aspect of the present disclosure, there may be provided a radar device including an antenna unit including a transmission antenna unit with a first transmission antenna and a second transmission antenna and a receiving antenna unit including a plurality of receiving antennas, a transceiver configured to transmit a transmission signal through the transmission antenna unit and receive a reception signal through the receiving antenna unit, and a signal processor configured to estimate an angle of a target by processing the transmission signal and the reception signal.

In this case, the signal processor may include a pre-acquisition unit configured to, during a first period within a scan period, perform two fast Fourier transforms (FFTs) on a first signal, perform digital beamforming or non-coherent integration and peak extraction, and determine a bin-rejection mask based on extracted peaks, and a normal-acquisition unit configured to, during a second period longer than the first period after the first period within the scan period, perform two fast Fourier transforms (FFT) on a second signal different from the first signal, perform digital beamforming or non-coherent integration and peak extraction, determine a Doppler component of a target, determine a virtual channel vector, and acquire information on the target based on the virtual channel vector.

As described below, certain embodiments of the present disclosures may obtain precise information related to one or more targets or objects around a vehicle by improving the memory efficiency of a radar device and reducing Doppler ambiguity.

In addition, some embodiments of the present disclosure may reduce memory capacity required in a vehicle radar device by a pre-acquisition processing step or operation for creating a bin-rejection mask to exclude range sections without velocity components.

Additionally, certain embodiments of the present disclosure may reduce Doppler ambiguity and accurately estimate a target or object angle by including a normal-acquisition processing step or operation for changing a pulse-repetition interval (PRI) within one scan period of a radar device.

BRIEF DESCRIPTION OF THE DRAWINGS

FIG. 4 is a diagram for explaining a method of creating a bin-rejection mask by a pre-acquisition unit according to an embodiment of the present disclosure.

DETAILED DESCRIPTION

Figure 1:
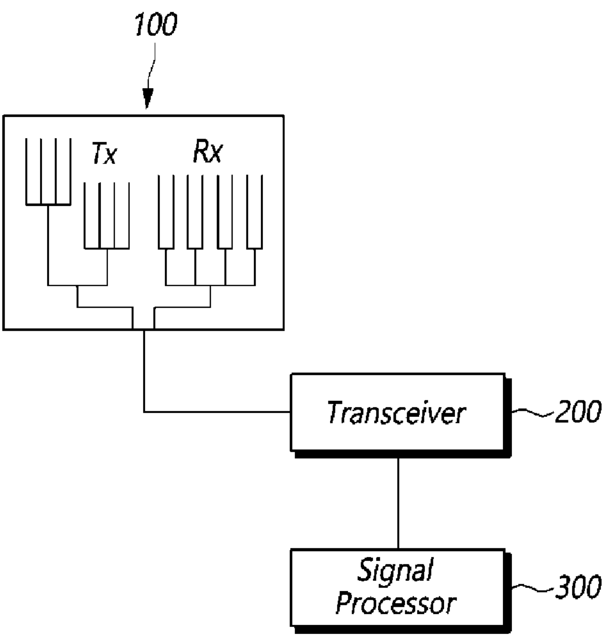
FIG. 1 illustrates a schematic configuration of a radar device according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, it will be described the embodiments in detail with reference to the drawings.

FIG. 1 illustrates a schematic configuration of a radar device according to an embodiment of the present disclosure.

A radar device according to an embodiment of the present disclosure may be, for example, but not limited to, a multi-input multi-output (MIMO) type radar device including a plurality of transmission antennas.

Hereinafter, a radar device having the plurality of transmission antennas including a first transmission antenna Tx1 and a second transmission antenna Tx2 will be described below as an example, but not limited thereto.

A radar device according to an embodiment may include an antenna unit 100, a transceiver 200, and a signal processor 300.

The antenna unit 100 may include a transmission antenna unit including a first transmission antenna Tx1 and a second transmission antenna Tx2, and a reception antenna unit including a plurality of reception antennas.

A specific configuration of the antenna unit 100 will be described in more detail below with reference to FIGS. 8 and 9.

The transceiver 200 may transmit a transmission signal through the transmission antenna unit and receive a reception signal through the reception antenna unit.

The transceiver 200 of the radar device according to the present embodiment may include a transmitter and a receiver. For example, the transmitter may include an oscillation part configured to generate a transmission signal by supplying a signal to each transmission antenna. Such an oscillation part may include, for example, a voltage-controlled oscillator (VCO), an oscillator, and the like.

The receiver included in the transceiver 200 may include a low noise amplifier (LNA) configured to low-noise-amplify a reflected signal received through the reception antenna, a mixer configured to mix the low-noise-amplified received signal, an amplifier configured to amplify the mixed received signal, and a converter such as an analog-to-digital converter (ADC) configured to digitally convert the amplified received signal to generate reception data.

As described above, the radar device according to the present embodiment may be the MIMO radar device that transmits a plurality of transmission signals simultaneously or in time division and receives the reception signals through a plurality of reception channels.

In general, radar sensor devices may be classified into a pulse type, a frequency modulation continuous wave (FMCW) type, and a frequency shift keying (FSK) type according to the type of signals used in the radar sensor devices.

For instance, the FMCW radar device may utilize an up-chirp signal or a ramp signal, which is a signal of which frequency increases with time, and may calculate information on an object using a time difference between a transmission wave and a reception wave and a Doppler frequency (fd) shift.

Hereinafter, it will be described an FMCW-type radar device using a fast chirp signal or an up-chirp signal as an example, but not limited thereto.

The signal processor 300 may determine a beat frequency or Doppler frequency fd from an intermediate frequency signal or a beat signal obtained by mixing (e.g., correlating) a transmission signal and a reception signal.

The Doppler frequency may be proportional to the distance to a target from which the received signal is reflected, and a velocity component or Doppler component of the target may be extracted based on a time change of the Doppler frequency or a phase change.

In addition, the signal processor 300 may generate a virtual channel vector as described below, and estimate an angle (for example, azimuth and/or elevation angle) of the target using the virtual channel vector.

That is, the signal processor 300 according to the present embodiment may obtain target information such as a distance or a range, a speed, and an angle of the target by processing the transmission signal and the reception signal.

The device for processing a radar signal in the radar device according to an embodiment of the present disclosure may be also referred as the signal processor 300 described above. The signal processor 300, in one example, may be configured to implement functionality and/or process instructions for execution. For example, the signal processor 300 may be capable of processing instructions stored in memory. These instructions may define or otherwise control the operation of the radar device. For example, the signal processor 300 may be any suitable circuitry and/or electronic components, such as a microprocessor or a digital signal processor (DSP).

In addition, in the present disclosure, a distance to the target and a range may be used with the same or similar meaning, and the speed of the target may be used with the same or similar meaning as Doppler.

Figure 2:
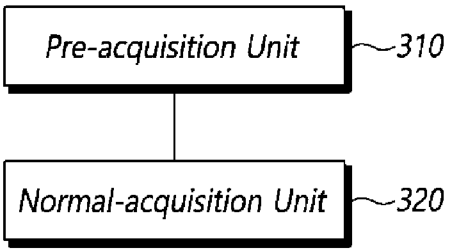
FIG. 2 illustrates a block diagram of a device for processing a radar signal according to an embodiment of the present disclosure.

FIG. 2 illustrates a block diagram of a device for processing a radar signal according to an embodiment of the present disclosure.

The device for processing a radar signal or the signal processor 300 of the radar device according to an embodiment of the present disclosure may include a pre-acquisition unit 310 and a normal-acquisition unit 320. The pre-acquisition unit 310 is configured to pre-process a signal during a first period within one scan period. The normal-acquisition unit 320 is configured to process a signal during a second period longer than the first period after the first period.

The pre-acquisition unit 310 may perform two Fast Fourier Transforms (hereinafter also referred to as 'FFT') for a first reception signal, perform digital beamforming or non-coherent integration and peak extraction, and determine a bin-rejection mask based on the extracted peaks.

The bin-rejection mask may be data for excluding a range section without a velocity component as a result of performing a two-dimensional FFT, and may be expressed in other terms such as bin-mask and filter.

The two-dimensional FFT may include a range FFT and a Doppler FFT.

The range FFT may perform a FFT on an intermediate frequency signal or beat signal corresponding to each up-chirp, and may be expressed as a distance FFT, a first FFT, and so on.

If the range FFT is performed, there may be generated a frequency domain matrix or a range-time domain map having peaks at intermediate frequencies fb1 and fb2 corresponding to distance (or range) to the target.

In addition, the Doppler FFT may be expressed as a velocity FFT or a second FFT, and may be a process of Fourier-transforming the result of the range FFT again. As an example, the second FFT may be a Discrete Fourier Transform (hereinafter referred to as "DFT"), and more specifically, may be a Chirp-Discrete Fourier Transform (Chirp-DFT) among DFTs.

If the Doppler FFT is performed, there may be generated a phase domain matrix or range-Doppler map having a peak at the phase change $\Delta\phi$ corresponding to the moving speed of the target.

The two-dimensional FFT processing will be described in more detail below with reference to FIG. 3.

Meanwhile, the normal-acquisition unit 320 of the signal processor 300 may perform, during a second period, two fast Fourier transforms (FFT) on a second signal different from the first signal, perform digital beamforming or non-coherent integration and peak extraction, determine a Doppler component of a target, determine a virtual channel vector, and acquire information on the target based on the virtual channel vector.

In this case, the second signal processed by the normal-acquisition unit 320 may have a second pulse-repetition interval PRI_2 different from a first pulse-repetition interval PRI_1 of the first signal processed by the pre-acquisition unit 310.

Accordingly, the Doppler ambiguity may be suppressed by using the signals having different pulse-repetition intervals (PRI) in the first period (e.g. a pre-acquisition period) and the second period (e.g. a normal-acquisition period). The configuration for preventing the Doppler ambiguity will be described in more detail below referring to FIG. 7 and the like.

In addition, the pre-acquisition unit 310 and the normal-acquisition unit 320 may extract the peak signal by a constant false alarm rate (CFAR) algorithm and a local-maximum algorithm.

The bin-rejection mask may be data representing a range section in which the Doppler component of the target exists.

More specifically, in the range-Doppler map generated by the two-dimensional FFT, a range section in which the Doppler component exists may be defined as a pass-bin.

In the range-Doppler map, the bin-rejection mask may be a mask representing a range section without Doppler components.

Specifically, a range FFT may be performed on N points or N samples for one chirp signal. In this case, N may be defined as a size of the range FFT.

Among N samples, the number of range sections in which Doppler components exist, that is, the number of pass-bins, may be defined as K. In this case, K may be a natural number smaller than N.

The first signal processed in the pre-acquisition unit 310 and the second signal processed in the normal-acquisition unit 320 may be an intermediate frequency signal acquired by mixing a first transmission signal and a second transmission signal transmitted from a first transmission antenna and a second transmission antenna, respectively, and a first reception signal and a second reception signal reflected from the target and received from a plurality of reception antennas.

In this case, the first transmission signal and the second transmission signal may be transmitted separately by time-division multiplexing (TDM method).

Alternatively, the first transmission signal and the second transmission signal may be signals differently modulated by binary phase modulation or signals distinguished by orthogonal codes (BPM method or CDM method).

Meanwhile, the pre-acquisition unit 310 may process Mp first signals (chirp signals) during the first period, and the normal-acquisition unit 320 may process Mn second signals during the second period. In this case, Mn may be larger than Mp.

In addition, the first transmission signal transmitted from the first transmission antenna and the second transmission signal transmitted from the second transmission antenna may be up-chirp signals having a first pulse-repetition interval PRI_1 and a second pulse-repetition interval PRI_2, respectively.

In addition, the normal-acquisition unit 320 may use the bin-rejection mask to select and store only data in a range with a Doppler component for each of the Mn chirp signals included in the second period.

That is, if the number of pass-bins determined by the bin-rejection mask is K, the normal-acquisition unit 320 may store K*Mn pieces of data in the memory during the second period.

Since K is smaller than N, the memory space for data storage may be reduced compared to a case of storing a total of N*Mn pieces of data without using a bin-rejection mask.

In addition, the two-dimensional fast Fourier transform (FFT) may include a range FFT and a Doppler FFT. The range FFT performed by the pre-acquisition unit 310 during the first period may have a first size N, and the range FFT performed by the normal-acquisition unit 320 during the second period may have a second size K smaller than the first size N.

The normal-acquisition unit 320 may acquires the number of frequency values corresponding to the second FFT size K through a second FFT such as Chirp-DFT (Discrete Fourier Transform), and may detect an object by calculating a beat frequency with the greatest power during each chirp period based on the acquired frequency value and obtaining speed information and distance information of the object based on the calculated beat frequency.

The signal processor 300 may be expressed in other terms such as a control unit or a controller, and may be implemented in the form of a digital signal processor (DSP).

In addition, the pre-acquisition unit 310 in the present embodiment may be expressed as a pre-processor or a first processor, and the normal-acquisition unit 320 may be expressed as a main processor unit or a second processor.

Alternatively, the pre-acquisition unit 310 and the normal-acquisition unit 320 may be implemented as software modules in a single processor and may be integrated into a single hardware, DSP.

As described above, in the radar device according to the present embodiment, one scan period may be divided into a pre-acquisition section (i.e. a first period) and a normal-acquisition section (i.e. second period), and the bin-rejection mask is created and used in the pre-acquisition section so that the memory capacity required for data processing in the normal-acquisition section may be reduced.

In addition, the radar device according to the present embodiment may utilize chirp signals having different pulse-repetition intervals PRI in the pre-acquisition section (i.e. a first period) and the normal-acquisition section (i.e. a second period), so that the Doppler ambiguity may be suppressed and a Doppler frequency may be more accurately determined. As a result, the virtual channel vector can be accurately generated and the target information can be precisely estimated.

Figure 3:
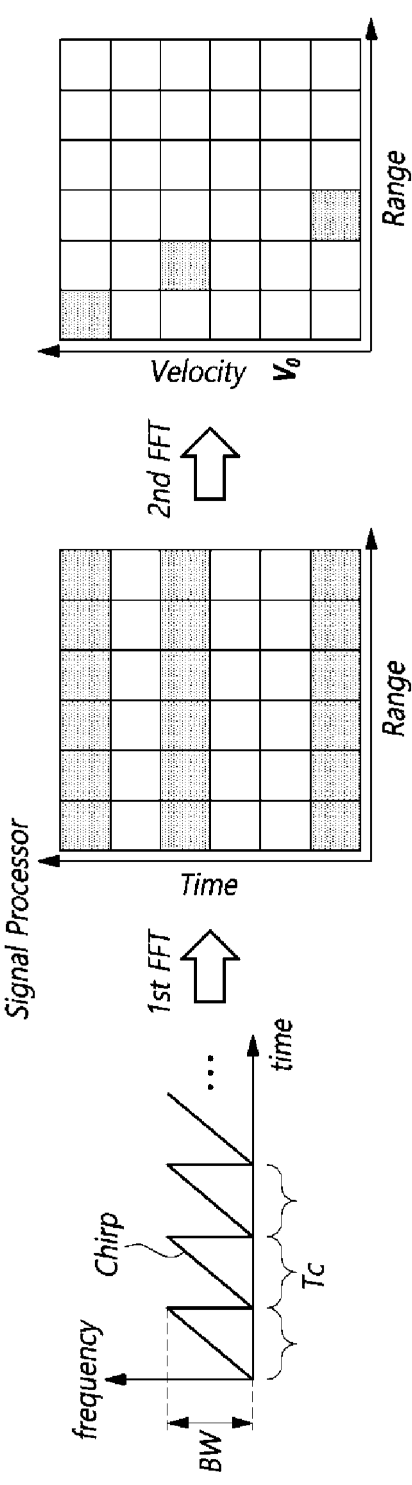
FIG. 3 illustrates an operation or principle in which a device for processing a radar signal acquires range-velocity information of a target according to an embodiment of the present disclosure.

FIG. 3 illustrates an operation or principle in which a radar apparatus acquires range-velocity information of a target according to an embodiment of the present disclosure.

Referring to FIG. 3, the radar device according to the present embodiment may perform a first Fourier transform (FFT) on a fast time of a reception signal to obtain a time component according to a range. In addition, the radar device may perform a second Fourier transform on a slow time thereof to compress a signal present at each range according to a velocity, thereby determining range-velocity information of a target or object.

As shown at the left side of FIG. 3, the signal processor 300 may perform the first Fourier transform (1st FFT) on a radar reception signal including a fast ramp or a fast chirp, thereby determining a range-time graph corresponding to a time component according to a range.

Next, the signal processor 300 may perform the second Fourier transform, which is a secondary Fourier transform, on a range-to-time component to determine range-velocity domain information indicating velocity information according to a range as shown at the right side of FIG. 3. The range-velocity domain information may be expressed on a range-Doppler map.

For example, as shown in FIG. 3, if a two-dimensional (2D) Fourier transform (FFT) is performed on a composite signal of the reception signal and a transmission signal, three grid areas may be represented as targets on the range-Doppler map, and the distance and speed of the target may be estimated therefrom.

In addition, the signal processor 300 of the radar device according to the present embodiment may perform Fourier-transform on the reception signal and extract the peaks of the reception signal using a constant false alarm rate (CFAR) algorithm or a local maximization method.

In addition, the signal processor 300 may generate a virtual channel vector for the reception signals, and may estimate angular information such as an azimuth angle and an elevation angle of the target using the generated virtual channel vector.

In this case, the signal processor 300 may compensate for the phase error which may exist between signals corresponding to the first and second transmission antennas. This may be referred as the phase compensation.

Figure 4:
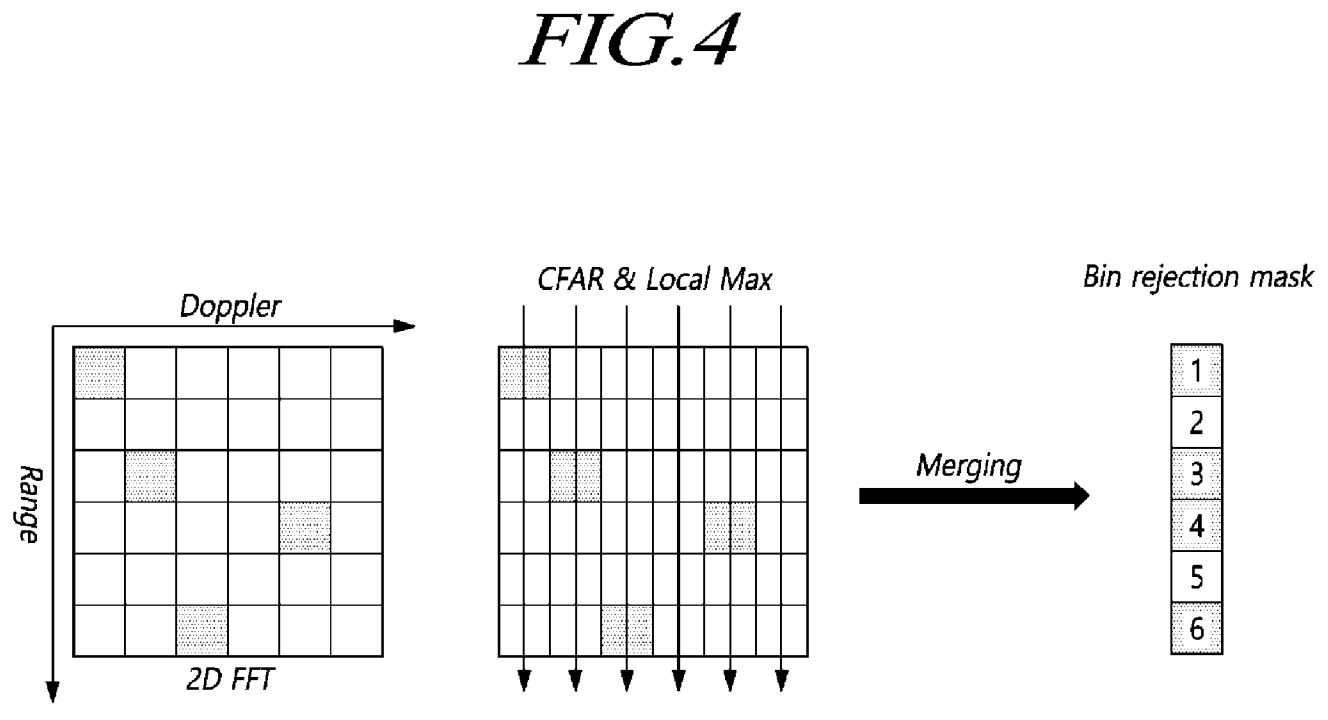

FIG. 4 is a diagram for explaining a method of creating a bin-rejection mask by a pre-acquisition unit according to an embodiment of the present disclosure.

The pre-acquisition unit 310 of the device for processing a radar signal according to an embodiment may perform two fast Fourier transforms (FFTs) on a first reception signal, and may acquire a reflection signal of a target through digital beam-forming (DBF) or non-coherent integration (NCI).

In addition, the pre-acquisition unit 310 may extract the peak of the reception signal using a constant false alarm rate (CFAR) algorithm or a local maximum algorithm, and may determine a bin-rejection mask based on the extracted peaks.

Referring to FIG. 4, the pre-acquisition unit 310 may process Mp chirp signals during the first period of the pre-acquisition mode within one scan period.

For instance, the pre-acquisition unit 310 may acquire data such as a beat signal by sampling N points for each of the Mp chirp signals. Accordingly, Mp*N pieces of data may be acquired during the first period. In this case, N may be expressed as the number of sampling or range FFT size, and this range FFT may be referred as an N-point FFT.

The pre-acquisition unit 310 may create a range-Doppler map by performing range FFT and Doppler FFT on the acquired data.

The range-Doppler map may include N range sections or range values, and each range section or range value may be expressed as a bin.

FIG. 4 illustrates a case in which N, which is the range FFT size, is six (6).

In this case, the range-Doppler map includes six bins, and the range is represented on the vertical axis.

The pre-acquisition unit 310 may perform digital beam-forming (DBF) or non-coherent integration (NCI), and may extract peaks through the CFAR or local maximum algorithm.

The pre-acquisition unit 310 may merge the extracted peaks to create a bin-rejection mask containing pass-bin information including the Doppler component.

In the example of FIG. 4, the first, third, fourth, and sixth bins among the six bins may have Doppler components, and, accordingly, the first, third, fourth, and sixth bins may be the pass-bins.

That is, in the example of FIG. 4, the bin-rejection mask includes the second and fifth rejected bins.

Thereafter, the normal-acquisition unit 320 may perform a range FFT on N samples for each chirp signal during the second period of the normal-acquisition mode. Then, the normal-acquisition unit 320 may use a bin-rejection mask to remove data on the rejected bins and store only the pass-bin data in the memory.

In the example of FIG. 4, the normal-acquisition unit 320 may remove the data of the second and fifth rejected bins, and stores only the range FFT data for the first, third, fourth and sixth pass-bins in the memory.

In this case, if the number of pass-bins included in the bin-rejection mask is K, K may be defined as a second size of the range FFT during the second period.

That is, the range FFT during the first period in the pre-acquisition mode may have a first size N, and the range FFT during the second period in the normal-acquisition mode may have a second size K smaller than the first size N.

Accordingly, the size of the data acquisition (DAQ) data or range FFT result data stored by the normal-acquisition unit 320 may be K*Mn, which is smaller than N*Mn. Therefore, according to some embodiments of the present disclosure, the memory capacity required to store data for radar signal processing may be reduced.

Figure 5:
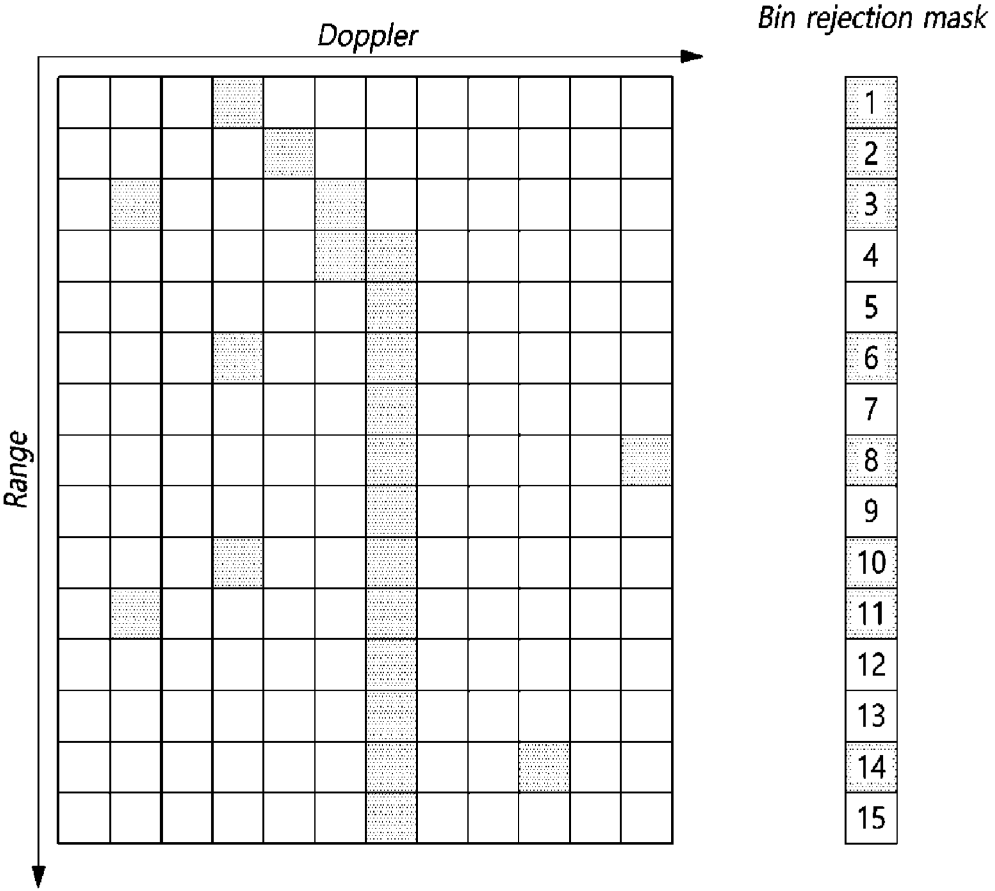
FIG. 5 illustrates an operation or principle of reflecting a stationary structure in creating a bin-rejection mask of a pre-acquisition unit according to an embodiment of the present disclosure.

FIG. 5 illustrates an operation or principle of reflecting a stationary structure in creating a bin-rejection mask of a pre-acquisition unit according to an embodiment of the present disclosure.

Meanwhile, if a stationary structure exists when creating a bin-rejection mask, the pre-acquisition unit 310 may exclude the bins representing the stationary structure from the pass-bins.

The bin-rejection mask may be used to reduce the load of data calculation and storage load in the normal-acquisition operation or step by excluding bins in which a meaningful target or object does not exist.

Meanwhile, clutter or stationary structures such as roadside guardrails, soundproof walls, tunnels, etc. may be detected by radar, but their importance for performing the function of the driver assistance system (DAS) may be lower than that of moving targets or stationary targets.

Accordingly, the pre-acquisition unit 310 according to an embodiment may set a bin recognized as a stationary structure as a rejected bin when generating the bin-rejection mask.

Referring to FIG. 5, an example that the Doppler map generated by 2-dimensional Fourier transform includes a total of 15 bins is illustrated.

As shown in FIG. 5, a total of 12 bins from the 4th to 15th bins all have the same Doppler value.

In the case that the same Doppler component (e.g. a velocity component) exists in multiple consecutive bins, those multiple bins may be determined as rejected bins.

That is, in the case that a plurality of bins having the same Doppler component exist in succession, the pre-acquisition unit 310 may create a bin-rejection mask so that these bins become rejected bins rather than pass-bins.

In addition, among the multiple consecutive bins having the same Doppler component, one or more bins further including another or other Doppler components may be determined as pass-bins.

For example, in the case of FIG. 5, among 12 consecutive bins (i.e., the 4th to 15th bins) having the same first Doppler component, the 6th, 8th, 10th, 11th and 14th bins further include a second Doppler component which is different from the first Doppler component.

In this case, the pre-acquisition unit 310 may create a bin-rejection mask such that, bins 4th, 5th, 7th, 9th, 12th, 13th and 15th bins having only the same first Doppler component among the 4th to 15th bins become rejected bins.

In this case, although the 4th bin includes another second Doppler component adjacent or next to the first Doppler component, since there may be recognized as occurring at the starting point of the stationary structure, so the 4th bin may be determined as a rejected bin rather than a pass-bin.

As shown in FIG. 5, the stationary area may be determined as an exception when creating a bin rejection mask and merging CFAR or local-maximum results.

The stationary area may be represented as a result of the peaks of the reception signal being arranged with the same Doppler component depending on the distance from the surrounding structures on the road.

In this case, the number of pass-bins, which are bins containing Doppler components, may exceed a certain threshold. Therefore, even if a distant target is detected, only bins in the near area may be recognized as pass-bins. If the number of pass-bins exceeds the processable threshold, the near region may be prioritized over the far region.

Therefore, in the case that the number of pass-bins increases due to a stationary area, there may prevent the problem of shortening the radar's detection range by setting bins due to stationary structures to the rejected bins and giving priority to moving targets.

That is, it is possible to prevent the problem that only the short-distance area is passed in the bin-rejection mask considering the stationary area, thereby preventing the problem of the radar's detection distance being reduced.

Figure 6:
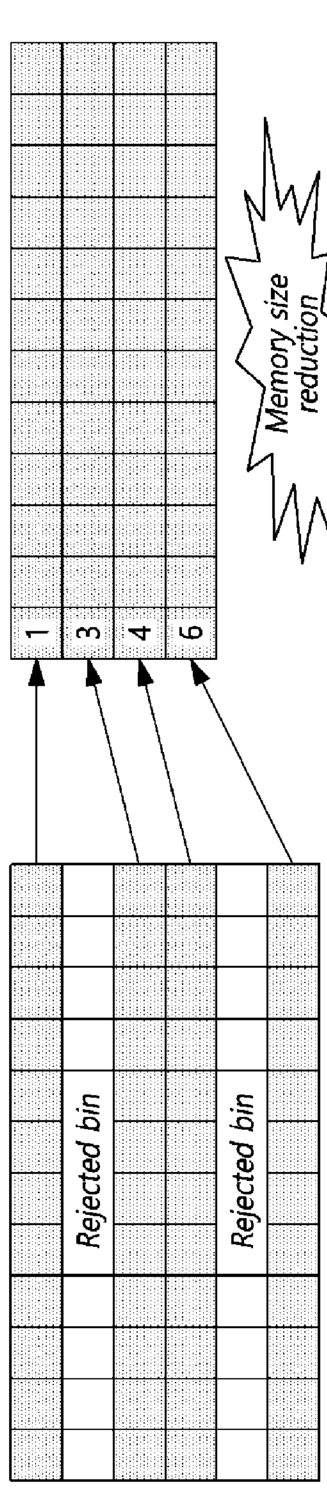
FIG. 6 is a diagram illustrating an operation or principle for reducing memory capacity required to process a radar signal by using a bin-rejection mask in a normal-acquisition unit according to an embodiment of the present disclosure.

FIG. 6 is a diagram illustrating an operation or principle for reducing memory capacity required to process a radar signal by using a bin-rejection mask in a normal-acquisition unit according to an embodiment of the present disclosure.

In the embodiment of FIG. 4, the $2^{nd}$ and $5^{th}$ bins among a total of 6 bins may be determined as the rejected bins by the pre-acquisition unit 310.

That is, in the cases of FIGS. 4 and 6, the bin-rejection mask may include the 1st, 3rd, 4th, and 6th pass-bins and the 2nd and 5th rejected bins.

The normal-acquisition unit 320 may perform a range FFT on each of the Mn chirp signals during the second period following the first period of the pre-acquisition mode.

In this case, the normal-acquisition unit 320 may perform a range FFT on K samples smaller than N for each chirp signal.

In the examples of FIGS. 4 and 6, the normal-acquisition unit 320 may perform, for each chirp signal, a range FFT only on K=4 points, which is the number of pass-bins where Doppler components exist, by using a bin-rejection mask, instead of performing the range FFT on all points, N=6 points, and store the resulting data in the memory. As a result, the computational load of the range FFT of the normal-acquisition unit 320 may be reduced.

Specifically, as shown in FIG. 6, the normal-acquisition unit 320 may store range FFT data for the 1st, 3rd, 4th, and 6th bins that are pass-bins among the 1st to 6th bins in the memory. As a result, memory efficiency may be improved by more than 33% compared to a case in which the present embodiment is not applied.

In addition, the normal-acquisition unit 320 may perform N-point range FFT on each of the second signals (e.g., chirp signals) during the second period, and then store only range FFT data corresponding to the pass-bin(s) in the memory by excluding data corresponding to the rejected bin(s).

As described above, the device for processing a radar signal according to an embodiment of the present disclosure may improve data calculation efficiency or data storage efficiency in a normal-acquisition mode for acquiring target information by using a bin-rejection mask created in a pre-acquisition mode.

The signal processing configuration of the pre-acquisition unit 310 and the normal-acquisition unit 320 according to this embodiment will be described again as follows.

The pre-acquisition mode includes a process of acquiring a range-bin containing a target signal in order to improve signal processing gain within a limited memory size. As a result, the bin-rejection mask is creased according to the present embodiment.

Specifically, in pre-acquisition mode, the FFT is performed with N samples for each chirp signal, the same as in the normal-acquisition mode.

In addition, a total of Mn chirp signals may be processed in the normal-acquisition mode (i.e., in second period), and a total of Mp chirp signals smaller than Mn may be processed in the pre-acquisition mode (i.e., in first period).

The pre-acquisition unit 310 may performs two dimensional FFTs(e.g., a range FFT and a Doppler FFT) on the acquired data (e.g., digitally converted ADC data). Thereafter, the pre-acquisition unit 310 may perform the digital beamforming (DBF) or non-coherent integration (NCI) on multiple channels.

The pre-acquisition unit 310 may perform CFAR for target signal detection based on the result of the digital beamforming (DBF) or non-coherent integration (NCI), and create the bin-rejection mask based on the CFAR results.

Meanwhile, in comparison to the pre-acquisition mode, the number of samples N in each chirp signal in the normal-acquisition mode is identical to the number of samples in each chirp signal in the pre-acquisition mode, but the number of chirps to be processed is Mn which is greater than that of the pre-acquisition mode.

Accordingly, the normal-acquisition unit 320 may perform a range FFT after receiving one chirp signal and store only the target signal, that is, the data of the range or bin containing the target's Doppler component. The bin-rejection mask can be used for this operation according to the present embodiment.

The normal-acquisition unit 320 may perform the same or similar process as above for Mn second signals (e.g., chirp signals).

Therefore, since the normal-acquisition unit 320 processes and/or stores only data in a specific range corresponding to the pass-bin, only a small memory capacity is needed. Even under the configuration of the same memory capacity, a higher number of samples N and chirp signals can be processed in the operation of the signal processing, thereby improving the signal processing gain.

Meanwhile, in general, FMCW using a fast chirp signal is a modulation method applied to a vehicle radar.

Using such FMCW modulation, the Doppler ambiguity may occur due to limitations in sampling rate.

That is, due to the limitation on the sampling rate during the FMCW modulation, a maximum detectable speed or a visible Doppler range, which is the range of detectable speeds, may be limited to a certain range.

For example, if the maximum detectable speed is limited to 100 km/h due to a limited sampling rate, a target with a speed of 170 km/h and a target with a speed of 70 km/h may be recognized as the same target.

In addition, the speed resolution also may have certain limitation due to constraints on the FFT size.

Accordingly, the Doppler component of the target may not be uniquely determined due to Doppler ambiguity, and therefore it may result in a difficulty of acquiring accurate target information.

In particular, since multiple signals are distinguished by time division multiplexing (TDM) or binary phase modulation (BPM) in MIMO radar devices, the Doppler ambiguity may be an obstacle.

It will be described the problems in the TDM or BCM method due to this Doppler ambiguity in more detail below referring to FIGS. 10 and 11.

Figure 7:
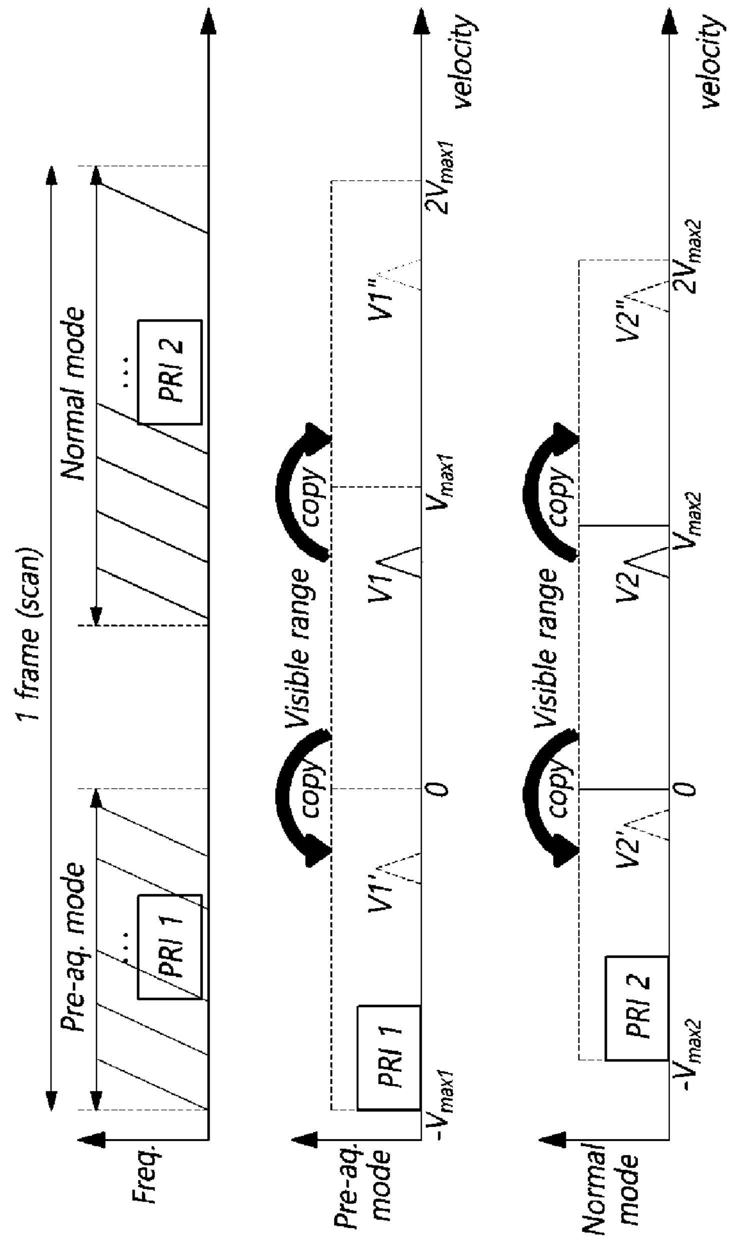
FIG. 7 illustrates an operation or principle of resolving Doppler ambiguity by using different pulse-repetition intervals (PRI) during first and second periods in a device for processing a radar signal according to an embodiment of the present disclosure.

FIG. 7 illustrates an operation or principle of resolving Doppler ambiguity by using different pulse-repetition intervals (PRI) during first and second periods in a device for processing a signal according to an embodiment of the present disclosure.

In a device for processing a signal according to an embodiment of the present disclosure, one scan period is divided into a first period and a second period in succession, the pre-acquisition unit 310 may operate during the first period, and the normal-acquisition unit 320 may operate during the second period.

The pre-acquisition unit 310 may process a first reception signal of a first pulse-repetition interval PRI_1 during the first period of the pre-acquisition mode, and the normal-acquisition unit 320 may process a second reception signal of a second pulse-repetition interval PRI_2 during the second period of the normal-acquisition mode.

In this case, the first pulse-repetition interval PRI_1 may be different from the second pulse-repetition interval PRI_2.

That is, the device for processing a signal according to the present embodiment may use the intra-scan PRI method in which two signals with different pulse-repetition intervals are processed within one scan period.

As described above, Doppler ambiguity may occur in radars device using FMCW modulation due to limitations in a sampling rate.

To solve this problem, a device for processing a signal may generally use signals of different pulse-repetition intervals PRI for each scan period, and this can be expressed as an inter-scan PRI method.

Unlike the conventional inter-scan PRI method, the device for according to the present embodiment may utilize an intra-scan PRI method which sequentially uses two signals with different pulse-repetition intervals within one scan period.

In addition, in the case that the pre-acquisition unit 310 processes the first reception signal of the first pulse-repetition interval PRI_1 during the first period, and the normal-acquisition unit 320 processes the second reception signal of the second pulse-repetition interval PRI_2 during the second period, a first speed detection range Vmax1 by the pre-acquisition unit 310 may be different from a second speed detection range Vmax2 by the normal-acquisition unit 320.

Meanwhile, if the pre-acquisition unit 310 and the normal-acquisition unit 320 perform a two-dimensional FFT on the first and second reception signals having the first pulse-repetition interval PRI_1 and the second pulse-repetition interval PRI_2, respectively, the velocity component peak of the target can be extracted.

Specifically, as shown in FIG. 7, the first velocity component peak V1 extracted by the pre-acquisition unit 310 may be within the first velocity detection range Vmax1. Additionally, the second velocity component peak V2 extracted by the normal-acquisition unit 320 may be within the second speed detection range Vmax2.

In this case, due to the Doppler ambiguity, the actual relative velocity of the target may be a value obtained or calculated by adding the first velocity detection range Vmax1 to a value of the first velocity component peak V1 and a value obtained or calculated by subtracting the first velocity detection range Vmax1 from the value of the first velocity component peak V1.

Similarly, the actual relative velocity of the target may be a value obtained or calculated by adding the second velocity detection range Vmax2 to a value of the second velocity component peak V2 and a value obtained or calculated by subtracting the second velocity detection range Vmax2 from the value of the second velocity component peak V2.

That is, due to the limitation of the first and second velocity detection ranges Vmax1 and Vmax2, targets with a velocity of V+Vmax1 or V−Vmax1 may be also represented as the same peak on the velocity-peak graph in addition to the target with a speed of V.

Accordingly, it may be unclear that the detected velocity component peak can be included in any one velocity range among the range of [−2Vmax to −Vmax], the range of [−Vmax to 0], the range of [0 to Vmax], and the range of [Vmax to 2Vmax].

Therefore, the device for processing a signal according to the present embodiment may utilize the intra-scan PRI method to process two signals with different pulse-repetition intervals in the first and second periods within one scan period, and may copy the detected first and second velocity component peaks to the left and right velocity detection ranges.

The device for processing a signal may copy the first and second velocity component peak to each of different first and second velocity detection ranges Vmax1 and Vmax2, and determine the matching velocity component peak in the two velocity-peak graphs as the final velocity component peak.

Therefore, the velocity components may be uniquely determined, thereby resolving the Doppler ambiguity issue.

In the example of FIG. 7, if the actual relative velocity value of the target is V, the first velocity component peak V1 determined by the first pulse-repetition interval and the second velocity component peak V2 determined by the second pulse-repetition interval may overlap while having the same value of V.

Meanwhile, the first velocity component peak V1 within the range of 0 to Vmax1 may be copied to the left and right velocity detection ranges [−Vmax1 to 0] and [Vmax1 to 2Vmax1], and accordingly a first-1 velocity component peak V1' and a first-2 velocity component peak V1" may be determined.

Similarly, the second velocity component peak V2 within the range of 0 to Vmax2 may be copied to the left and right velocity detection ranges [−Vmax2 to 0] and [Vmax2 to 2Vmax2], and accordingly a second-1 velocity component peak V2' and a second-2 velocity component peak V2" may be determined.

In this case, the first velocity component peak V1 within the range of 0 to Vmax1 and the second velocity component peak V2 within the range of 0 to Vmax2 may have the same velocity value and overlap with each other.

On the other hand, the first-1 velocity component peak V1' copied to the left and right may not overlap with the second-1 velocity component peak V2', and the first-2 velocity component peak V1" may not overlap with the second-2 velocity component peak V2".

Therefore, the first velocity component peak V1 within the range of 0 to Vmax1 or the second velocity component peak V2 within the range of 0 to Vmax2 may be determined as the actual velocity component peak of the target, thereby resolving the Doppler ambiguity.

That is, the device for processing a signal according to the present embodiment may utilize the intra-scan PRI method which sequentially uses two signals with different pulse-repetition intervals within one scan period, and may utilize a configuration of copying the velocity component peaks to another velocity detection range. Therefore, the relative velocity component of the target may be uniquely determined, thereby resolving Doppler ambiguity.

Figure 8:
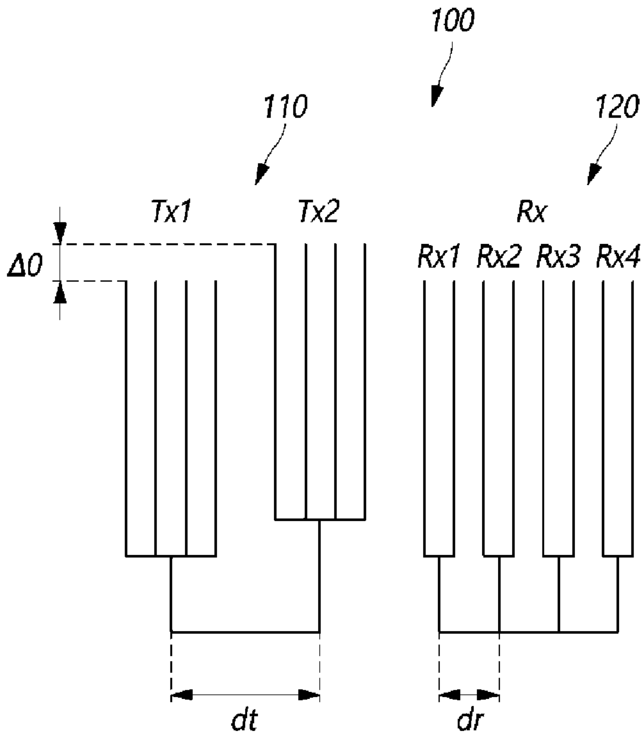
FIG. 8 illustrates an antenna unit of a radar device according to an embodiment of the present disclosure.

FIG. 8 illustrates an antenna unit of a radar device according to an embodiment of the present disclosure.

Referring to FIG. 8, the antenna unit 100 of the radar device according to the present embodiment may include a transmission antenna unit 110 including Nt transmission antennas and a reception antenna unit 120 including Nr reception antennas.

FIG. 8 shows an example in which Nt is 2 and Nr is 4, although not required.

According to the embodiment of FIG. 8, the antenna unit 100 may include two transmission antennas Tx1 and Tx2 and four reception antennas Rx1, Rx2, Rx3 and Rx4. The two transmission antennas Tx1 and Tx2 may be spaced apart by a predetermined offset distance ΔO in a vertical direction, while a plurality of reception antennas Rx1, Rx2, Rx3 and Rx4 may all have the same vertical position.

Figure 9A:
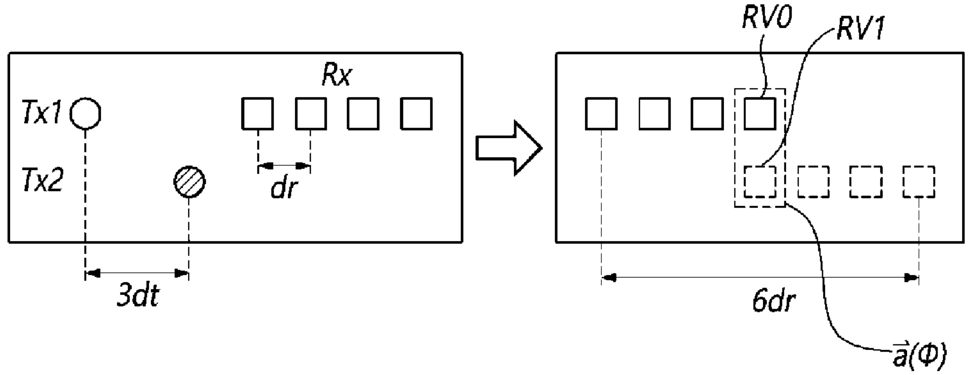
FIGS. 9A and 9B illustrate an arrangement structure of a transmission antenna and a reception antenna included in an antenna unit of a radar device and an arrangement of a virtual reception channel vector according to an embodiment of the present disclosure.
Figure 9B:
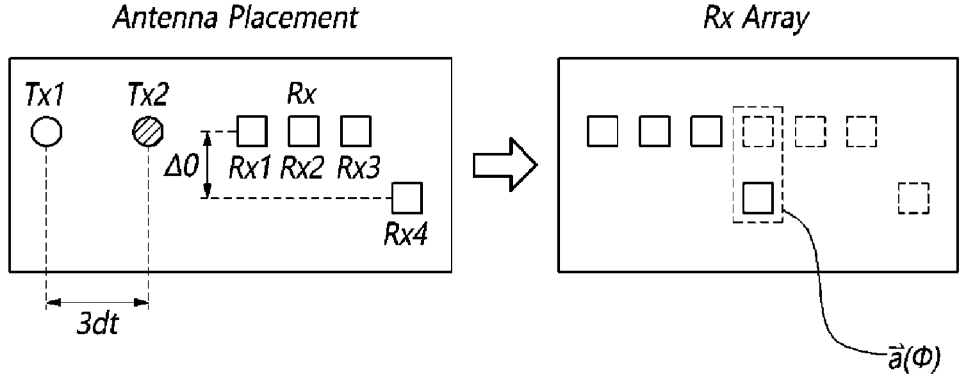

Alternatively, as shown in FIG. 9B, one of the reception antennas may be offset in the vertical direction.

Each of the transmission antenna and the reception antenna may have a structure in which two, four, or six array antennas have one feed point and extend to one side, but the present disclosure is not limited thereto.

Each array antenna constituting the transmission antenna and the reception antenna may include a plurality of elements or patches connected to an output line of a divider and may extend in an upper direction (upper direction of a vertical direction) from a starting point such as a feed port connected to a chip including a controller or an input port of the divider.

In addition, the two transmission antennas Tx1 and Tx2 constituting the transmission antenna unit may be spaced apart from each other by a horizontal distance dt in a horizontal direction perpendicular to an extending direction of each array antenna. In this case, the horizontal distance dt may be a distance of ½ of a wavelength of a transmission signal (0.5λ).

In this case, four reception antennas Rx1 to Rx4 constituting the reception antenna unit may also be disposed apart from each other by a horizontal distance dr in the horizontal direction.

In this case, the horizontal distances dt and dr are set to the distance of ½ of the wavelength of the transmission signal (0.5λ) in order to remove angle ambiguity caused by a grating lobe.

That is, since a distance between the reception antennas is greater than or equal to the distance of ½ of the wavelength of the transmission signal (0.5λ), the grating lobe may occur. The horizontal distance between the reception antennas is set to 0.5λ, and pieces of angle information extracted from channels of the reception antennas are compared and compensated, thereby reducing or minimizing the angle ambiguity of angle measurement caused by the grating lobe.

In addition, as shown in FIG. 8, since the two transmission antennas Tx1 and Tx2 are offset by the certain offset distance ΔO in the vertical direction, a first reception signal transmitted from the transmission antenna Tx1 and received by the reception antenna and a second reception signal transmitted from the transmission antenna Tx2 and received by the reception antenna may have a phase difference according to a vertical offset.

In addition, a first transmission signal and a second transmission signal having orthogonality to each other may be simultaneously transmitted through the first transmission antenna TX1 and the second transmission antenna TX2.

Therefore, a target distance to a target may be determined using a time difference between a transmission time and a reception time, and horizontal information or vertical information (e.g., elevation angle) of the target may be determined using a phase difference between the first and second transmission signals and the first and second reception signals.

In the radar device according to the present embodiment, radar signals transmitted or received from the transmission antenna or reception antenna offset in the horizontal direction may be modulated and used through different modulation methods.

Meanwhile, in the radar device according to the present embodiment, due to a virtual reception antenna-forming unit, a reception end may have a reception array structure in which a plurality of reception antennas are actually present, and also, a plurality of virtual reception antennas are virtually present.

As described above, an antenna structure in which a plurality of virtual reception antennas are further virtually present at the reception end may be expressed as an "antenna structure having a virtual aperture structure."

For example, in an antenna structure of FIG. 8, during a certain detection period (or frame or the like), the first transmission signal and the second transmission signal having orthogonality to each other are simultaneously transmitted through the first transmission antenna TX1 and the second transmission antenna TX2.

Meanwhile, since the first transmission antenna TX1 and the second transmission antenna TX2, which respectively transmit the first transmission signal and the second transmission signal, are spaced apart from each other by the horizontal distance dt in the horizontal direction and the offset distance DO in the vertical direction, the reception antenna receiving a reflected signal reflected from an object has the same effect as that when reflected signals of the first transmission signal and the second transmission signal are received by being shifted by the horizontal distance dt in the horizontal direction and the offset distance ΔO in the vertical direction.

In this case, as a concept distinguished from an actual reception antenna, a reception antenna, which is virtually present due to horizontal and vertical separation between transmission antennas which simultaneously transmit signals, may be expressed as a virtual reception antenna.

In addition, a vector from a specific reference point to each virtual reception antenna may be expressed as a virtual channel vector.

FIG. 9 illustrates an arrangement structure of a transmission antenna and a reception antenna included in an antenna unit of a radar device and arrangement of a virtual reception channel vector according to the arrangement structure according to an embodiment of the present disclosure.

In FIG. 9, the transmission antenna is illustrated as a circle and the reception antenna is illustrated as a rectangle. In addition, the actual antenna is indicated by a solid line, and the virtual reception antenna is indicated by a dotted line.

In an embodiment of FIG. 9A, two transmission antennas Tx1 and Tx2 are disposed apart from each other by a horizontal distance 3*dt* in a horizontal direction and an offset distance ΔO in a vertical direction. In addition, four reception antennas have the same vertical position as the transmission antenna Tx1 and are disposed apart from each other by a horizontal distance dr.

In this case, four virtual reception antennas formed at a reception end are formed to be offset from the four actual reception antennas by the horizontal distance 3*dt* in the horizontal direction and the offset distance ΔO in the vertical direction.

In the embodiment of FIG. 9A, a radar device according to the present embodiment includes the plurality of transmission antennas and the plurality of reception antennas, and one of the plurality of transmission antennas is disposed apart from the other of the plurality of transmission antennas by the offset distance in the vertical direction. In addition, different transmission signals having orthogonality are transmitted from the transmission antennas.

Accordingly, a composite signal of a reception signal and a transmission signal reflected from a target may be divided in the vertical direction, and thus vertical information of the target may be determined.

In addition, an aperture of the reception antenna may be expanded by the plurality of virtual reception antennas formed at a reception side, thereby improving resolution.

A size of the aperture of the reception antenna may be defined by a distance between the reception antennas disposed at both ends of the reception side.

Accordingly, in the case of FIG. 9A, the size of the aperture of the reception antenna may be extended to a horizontal distance 6*dr*.

Therefore, as shown in FIG. 9A, the detection resolution may be improved by using aperture expansion through the virtual reception antenna.

FIG. 9B illustrates an embodiment in which a reception antenna is vertically offset.

In the embodiment of FIG. 9B, two transmission antennas Tx1 and Tx2 are spaced apart from each other by a horizontal distance 3*dt* in a horizontal direction and are not offset in a vertical direction. On the other hand, among four reception antennas, one reception antenna Rx4 is spaced apart from the other three reception antennas Rx1 to Rx3 by an offset distance DO in the vertical direction. In other words, one reception antenna Rx4 has a different vertical position from the other three reception antennas Rx1 to Rx3, which has the same vertical position, by an offset distance ΔO.

That is, the three reception antennas Rx1 to Rx3 are disposed at the same vertical position as the two transmission antennas Tx1 and Tx2, and only one reception antenna Rx4 is disposed to be offset by the offset distance ΔO in the vertical direction. A distance between the reception antennas in the horizontal direction is a horizontal distance dr.

As shown at the right side of FIG. 9B, at a reception side, a virtual reception antenna array having a shape similar to that of FIG. 9A may be formed.

In FIGS. 8 and 9, a virtual channel vector $\vec{a}(\phi)$ between a virtual reception antenna Rv0 and a virtual reception antenna Rv1 vertically spaced apart by Δ0 therefrom among virtual reception antennas may be expressed by Equation 1 below.

$$\vec{a}(\phi)=\begin{bmatrix}\vec{a}_0(\phi)\\ \vec{a}_1(\phi)\end{bmatrix}=\begin{bmatrix}1\\ \exp(j2\pi d\sin\phi)\end{bmatrix} \qquad \text{[Equation 1]}$$

Here, $\vec{a}_0(\phi)$ is a virtual channel vector of the virtual reception antenna Rv0, $\vec{a}_1(\phi)$ is a virtual channel vector of the virtual reception antenna Rv1, d is the vertical offset distance DO between the virtual reception antennas Rv0 and Rv, and p is the phase of the signal.

In conclusion, the transceiver 200 of the radar device according to the present embodiment may form (Nt−1)*Nr virtual reception antennas or virtual channel vectors.

As shown in FIGS. 8 and 9, in the radar device according to the present embodiment, the transmission antenna or the reception antenna among the MIMO antennas may be offset in the vertical direction and different transmission signals may be used so as to acquire the azimuth information of the target as well as the vertical direction information such as an elevation angle or a height information.

Accordingly, by using the MIMO method, an antenna aperture can be increased by the formation of a virtual reception antenna, thereby improving the angular resolution of the radar device.

In addition, if a MIMO method including a vertical offset antenna is used, it is possible to estimate the vertical information of a target, for example, an elevation angle by virtually arranging antennas in a vertical direction.

Meanwhile, in order to accurately estimate the horizontal information (e.g., azimuth) and vertical information (e.g., elevation angle) of the target, there may be required to uniquely determine the velocity component of the target as well as the distance component of the target. Accordingly, the reduction or removal of the Doppler ambiguity may be needed.

Figure 10:
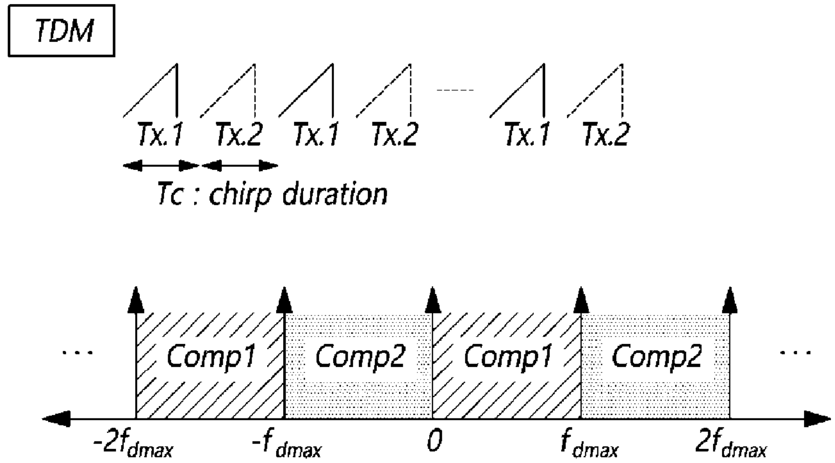
FIG. 10 is a diagram illustrating a signal waveform and the principle of occurrence of Doppler ambiguity in the case that a radar device operates with time division multiplexing (TDM) according to an embodiment of the present disclosure.

FIG. 10 is a diagram illustrating a signal waveform and the principle of occurrence of Doppler ambiguity in the case that a radar device operates with time division multiplexing (TDM) according to an embodiment of the present disclosure.

a virtual channel vector needs to be accurately configured in order to prevent problems with inaccurate target information estimation (for example, azimuth and elevation angle estimation). The Doppler ambiguity problem should be resolved to configure an accurate virtual channel vector regardless of a modulation method.

In the case of TDM, when configuring a virtual channel vector, the channel vectors of the transmission antennas Tx1 and Tx2 may be distinguished from each other since the transmission order of signals in multiple transmission antennas can be determined.

However, since the term for phase compensation is different depending on the Doppler frequency fd, it is required to determine an unique target velocity component by resolving the Doppler ambiguity problem before estimating the target angle. In such a case, an accurate virtual channel vector may be generated by applying an accurate phase compensation term.

Referring to FIG. 10, a first transmission signal (illustrated as a solid line) transmitted from the transmission antenna Tx1 and a second transmission signal (illustrated as a dotted line) transmitted from the transmission antenna Tx2 may be separated by time division. Therefore, the range-Doppler graph for the corresponding first and second reception signals may also be determined separately.

In this case, a virtual channel vector r for a target can be calculated according to Equation 2 as follows.

$$\vec{r}(f_d) = \begin{bmatrix} \vec{r}_{Tx1}(f_d) \\ \vec{r}_{Tx2}(f_d)\cdot\exp(j\Delta\varphi) \end{bmatrix} \quad \text{[Equation 2]}$$

Here, Δϕ is a term of the phase compensation, which is a function of the Doppler frequency fd.

Meanwhile, as shown in FIG. 10, if the Doppler frequency fd is in the range [0~fdmax] or [−2fdmax~−fdmax] (i.e., Comp1), the phase compensation term Δϕ may be calculated by the Equation 3 as follow.

$$\Delta\varphi = -\pi f_d T_c \quad \text{[Equation 3]}$$

Here, fd is the Doppler frequency and Tc is the duration of the chirp signal.

On the other hand, if the Doppler frequency fd is in the range [fdmax~2 fdmax] or [−fdmax~0] (i.e., Comp2), the phase compensation term Δϕ may be calculated by Equation 4 below.

$$\Delta\varphi = -\pi f_d T_c + \pi \quad \text{[Equation 4]}$$

Accordingly, the phase compensation term may be determined according to the velocity detection range including the Doppler frequency fd, and the virtual channel vector can be uniquely determined only when the phase compensation term is accurately determined.

Therefore, in the present embodiment, the phase compensation term in TDM modulation may be uniquely determined by using the intra-scan PRI method and peak copying configuration, as described with reference to FIG. 7.

Therefore, it is possible to resolve Doppler ambiguity, determine an accurate virtual channel vector, and accurately estimate the angle of the target.

Figure 11:
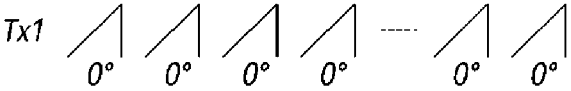
FIG. 11 is a diagram illustrating a signal waveform and the principle of occurrence of Doppler ambiguity in the case that a radar device uses binary phase modulation (BPM) according to an embodiment of the present disclosure.
Figure 11:
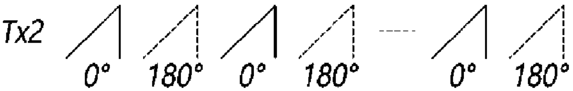

FIG. 11 is a diagram illustrating a signal waveform and the principle of occurrence of Doppler ambiguity in the case that a radar device uses binary phase modulation (BPM) according to an embodiment of the present disclosure.

In the case of binary phase modulation (BPM)), since the signals of the transmission antennas Tx1 and Tx2 are transmitted simultaneously, a phase compensation process such as TDM is not required in configuring a virtual channel vector.

That is, as shown in FIG. 11, in the case of the binary phase modulation (BPM), the first transmission signal transmitted from the transmission antenna Tx1 may comprise a chirp signal with a phase of 0, and the second transmission signal transmitted from the transmission antenna Tx2 may be in the form of repeated chirps with a phase of 0 degree and 180 degrees.

In this case, since the two signal components corresponding to the first and second transmission signals may be in the same range bin and the Doppler frequency fd may appear in the form of an interval of f(d_max)/2 on the range-Doppler map, whether the signal component is Tx1 or Tx2 may not be determined.

Specifically, the virtual channel vectors $\vec{r}$ for two signals may be calculated as two different values according to Equation 5 as follows.

$$\vec{r}(f_d) = \begin{bmatrix} \vec{r}(f_d) \\ \vec{r}\left(f_d + \frac{f_{d_{max}}}{2}\right) \end{bmatrix} \; VS \; \vec{r}(f_d) = \begin{bmatrix} \vec{r}(f_d) \\ \vec{r}\left(f_d - \frac{f_{d_{max}}}{2}\right) \end{bmatrix} \quad \text{[Equation 5]}$$

Therefore, in a MIMO radar device of BPM-type, the virtual channel vectors for the two signal components may not be uniquely determined, and accordingly there may be difficult to accurately estimate the target angle.

In the present embodiment, as described with reference to FIG. 7, the virtual channel vector in BPM modulation may be uniquely determined by using the intra-scan PRI method and peak copy configuration.

Therefore, some embodiments of the present disclosure can accurately estimate the angle of the target by resolving Doppler ambiguity.

Figure 12:
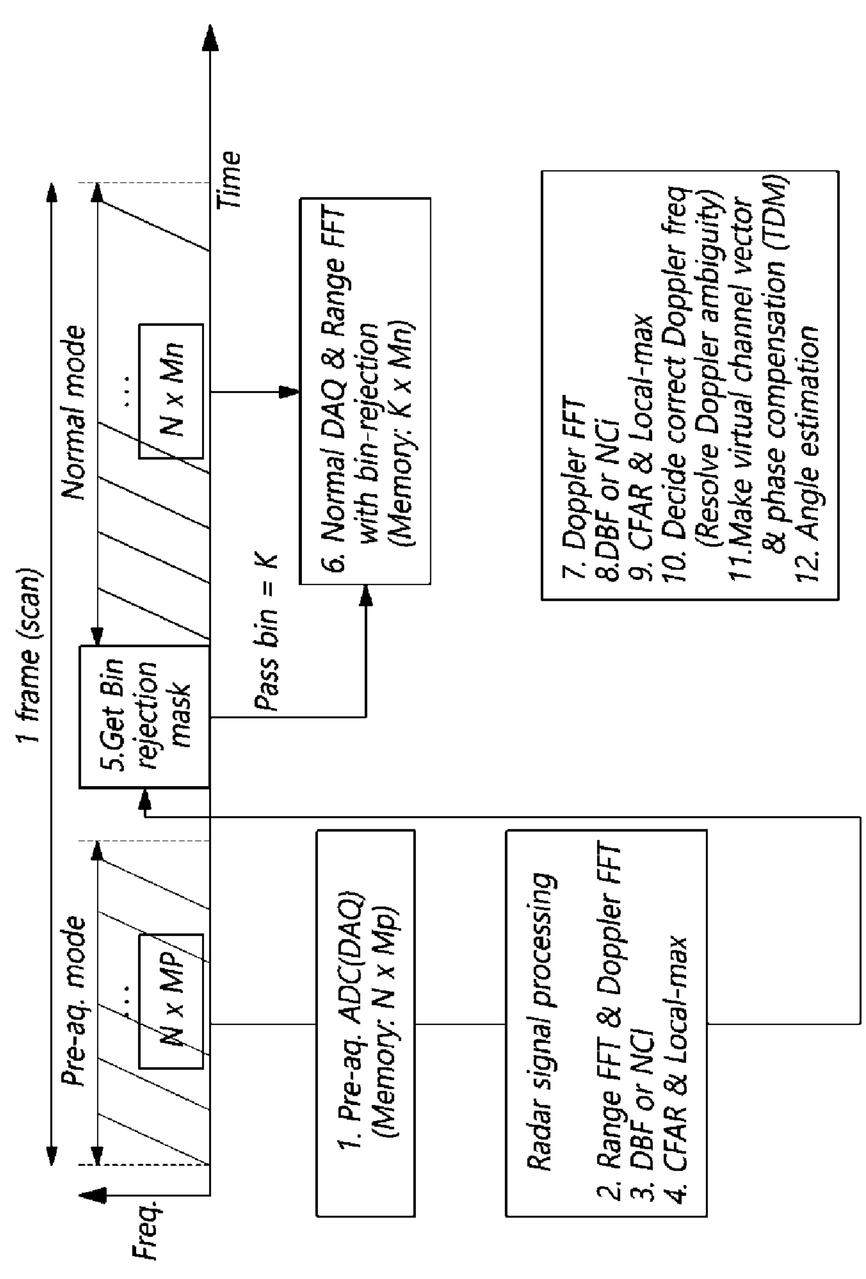
FIG. 12 illustrates a signal waveform in the first and second periods and operations performed in each step in a method for processing a radar signal according to an embodiment of the present disclosure.

FIG. 12 illustrates a signal waveform in the first and second periods and operations performed in each step in a method for processing a radar signal according to an embodiment of the present disclosure.

Referring to FIG. 12, in a method for processing a radar signal according to the present embodiment, one scan period or one frame may be divided into a first period of a pre-acquisition mode and a second period of a normal-acquisition mode after the first period.

A first signal including Mp chirp signals may be transmitted and received during the first period, and a second signal including Mn chirp signals may be transmitted and received during the second period.

For instance, the first period may be shorter than the second period, and Mn may be greater than Mp.

The first pulse-repetition interval PRI_1 of the first signal may be different from the second pulse-repetition interval PRI_2 of the second signal.

In the pre-acquisition mode, the pre-acquisition unit 310 may 1) store ADC data for the first signal mixed with the first transmission signal and the first reception signal in memory, and 2) perform two fast Fourier Transforms (FFTs) on the first signal, 3) perform digital beamforming or non-coherent integration on the first signal on which the two FFTs are performed, 4) extract peaks using CFAR or local maximum Algorithms from the first signal on which the digital beamforming or non-coherent integration is performed, and 5) create a bin-rejection mask based on the extracted peaks.

The bin-rejection mask may represent a range section in which the Doppler component of the target exists. Specifically, the bin-rejection mask may represent K pass-bins in which the Doppler component of the target exists among N bins, and (N−K) rejected bins.

The two fast Fourier transform (FFT) may include, for instance, but not limited to, a range FFT and a Doppler FFT. The range FFT during the first period may have a first size N, and the range FFT during the second period may have a second size K smaller than the first size N. In this case, the second size K may be equal to the number of pass-bins of the bin-rejection mask.

In the normal-acquisition mode, the normal-acquisition unit 320 may utilize the bin-rejection mask to select only data in a range with a Doppler component for each of the Mn chirp signals included in the second period.

Specifically, the normal-acquisition unit 320 may 6) perform a range FFT using the bin-rejection mask on the ADC data for the second signal during the second period, and then store K*Mn first FFT result data in memory.

Thereafter, the normal-acquisition unit 320 may 7) perform Doppler FFT on the first FFT result data stored in the memory, 8) perform digital beamforming or non-coherent integration on the first FFT result data on which the Doppler FFT is performed, and 9) extract the peaks through CFAR or local maximum Algorithm on the first FFT result data on which the digital beamforming or non-coherent integration is performed.

The normal-acquisition unit 320 may determine an accurate Doppler frequency fd by using the intra-scan PRI method and peak copy configuration described above with reference to FIG. 7.

The normal-acquisition unit 320 may generate a virtual channel vector using the determined Doppler frequency, and estimate the angle of the target.

In case of the TDM, phase compensation may be further performed at this time.

Figure 13:
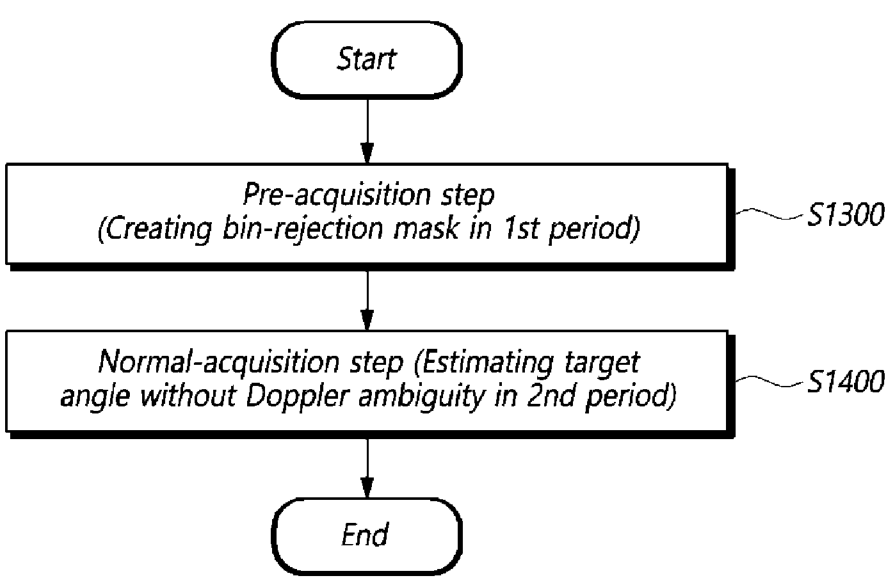
FIG. 13 is a schematic flowchart of a method for processing a signal according to an embodiment of the present disclosure.
Figure 14:
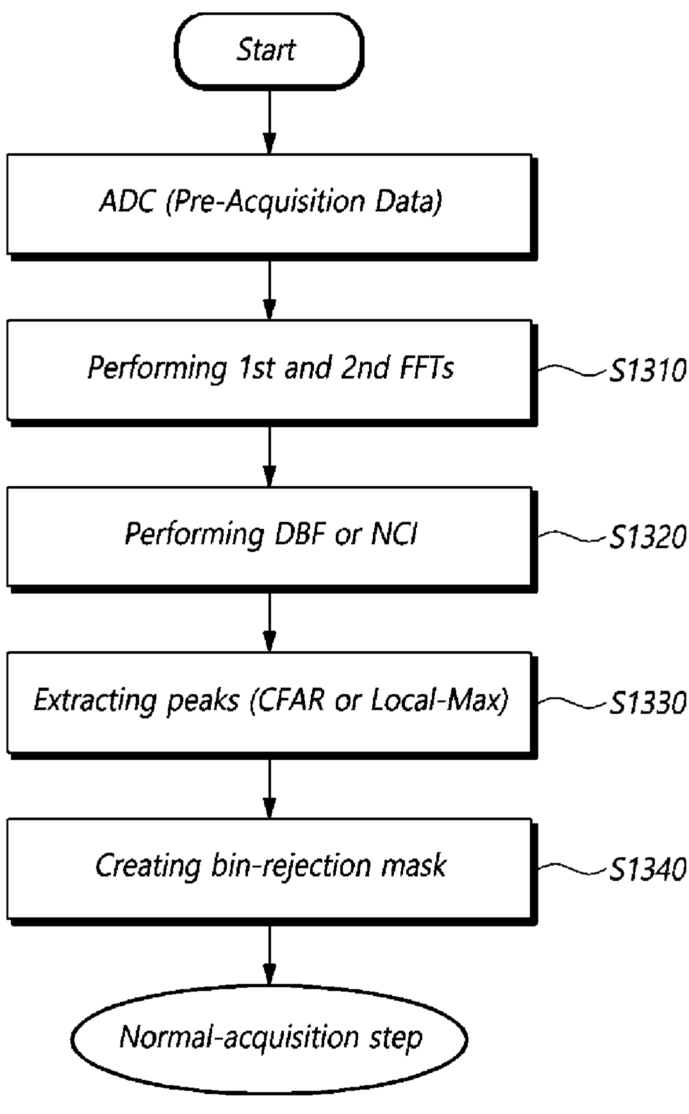
FIG. 14 is a flowchart illustrating pre-acquisition operations in a method for processing a signal according to an embodiment of the present disclosure.
Figure 15:
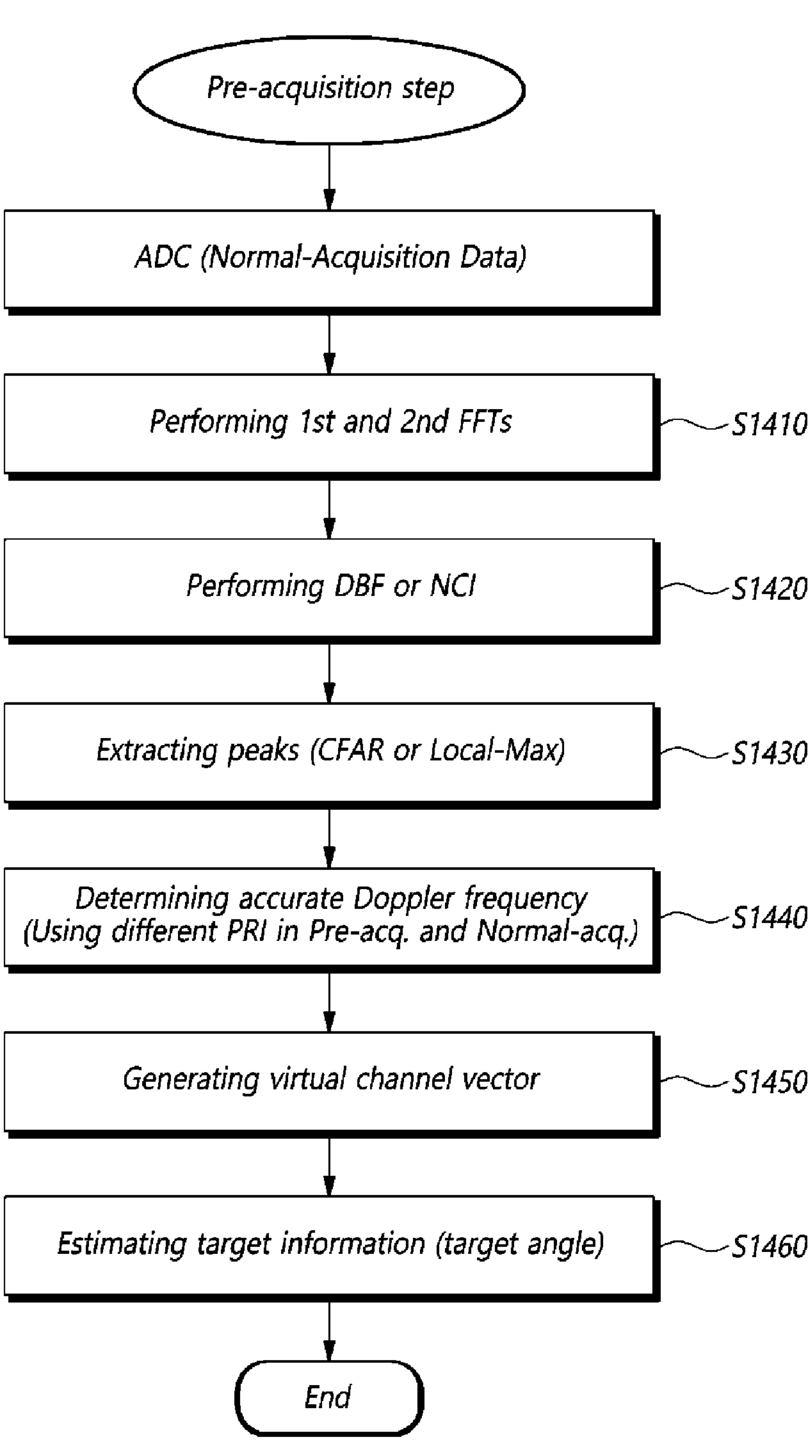
FIG. 15 is a flowchart showing normal-acquisition operations in a method for processing a signal according to an embodiment of the present disclosure.

FIG. 13 is a schematic flowchart of a method for processing a signal according to an embodiment of the present disclosure, FIG. 14 is a flowchart illustrating pre-acquisition operations in a method for processing a signal according to an embodiment of the present disclosure, and FIG. 15 is a flowchart showing normal-acquisition operations in a method for processing a signal according to an embodiment of the present disclosure.

The method for processing a signal according to an embodiment of the present disclosure may include a pre-acquisition step (step S1300) for determining a bin-rejection mask during a first period included in one scan period, and a normal-acquisition step (step S1400) for performing the estimation of a target angle during a second period longer than the first period within the one scan period.

As illustrated in FIG. 14, the pre-acquisition step (step S1300) of FIG. 13 may include performing two fast Fourier transforms (FFT) on the first signal (step S1310), performing digital beamforming or non-coherent integration on the first signal on which two FFTs are performed (step S1320), extracting a signal peak corresponding to the target based on CFAR or local-maximum algorithm from the first signal on which the digital beamforming or non-coherent integration is performed (step S1330), and determining a bin-rejection mask based on the extracted peak (step S1340).

The bin-rejection mask may be information indicating a range section in which the Doppler component of the target exists.

Two fast Fourier transform (FFT) may include, for example, but not limited to, a range FFT and a Doppler FFT. In addition, the range FFT during the first period may have a first size N, and the range FFT during the second period may have a second size K which is smaller than the first size N.

In this case, the second size K may be a size of the pass-bin determined based on the bin-rejection mask.

As illustrated in FIG. 15, the normal-acquisition step (step S1400) of FIG. 13 may include performing two fast Fourier transforms (FFT) on a second signal, which is different from the first signal processed in the pre-acquisition step S1300 (step S1410), and performing digital beamforming or non-coherent integration on the second signal on which two FFTs are performed (step S1420), extracting a signal peak corresponding to the target based on the CFAR or local-max algorithm from the second signal on which the digital beamforming or non-coherent integration is performed (step S1430), determining the Doppler frequency of the target (step S1440), determining a virtual channel vector based on the determined Doppler frequency (step S1450), and acquiring target information based on the virtual channel vector (step S1460).

In this case, in a MIMO radar device, the first signal and/or the second signal may be an intermediate frequency signal acquired by mixing a first transmission signal and a second transmission signal transmitted from a first transmission antenna and a second transmission antenna, respectively, and a first reception signal and a second reception signal reflected from the target and received from a plurality of reception antennas.

In addition, the first transmission signal and the second transmission signal may be signals transmitted sequentially by time-division multiplexing.

Alternatively, the first transmission signal and the second transmission signal may be signals modulated differently by binary phase modulation.

The first transmission signal and the second transmission signal may be up-chirp signals, and the number Mp of up-chirp signals during the first period may be smaller than the number Mn of up-chirp signals during the second period.

The first pulse-repetition interval PRI_1 of the first signal may be different from the second pulse-repetition interval PRI_2 of the second signal.

An intra-scan PRI method that uses two signals with different pulse-repetition intervals within one scan period may be used in an embodiment of the present disclosure.

In addition, in the Doppler frequency determination step (step S1440), the unique Doppler frequency may be determined by using the intra-scan PRI method and peak copy configuration, as described above with reference to FIG. 7.

Therefore, an accurate virtual channel vector may be determined by resolving the Doppler ambiguity.

In addition, step S1410 may further include selecting and storing only data in a range with a Doppler component for each of the Mn chirp signals included in the second period using a bin-rejection mask.

Specifically, step S1410 may include performing a range FFT using a bin-rejection mask on the ADC data for the second signal during the second period, and storing K*Mn first FFT result data in the memory.

Figure 16:
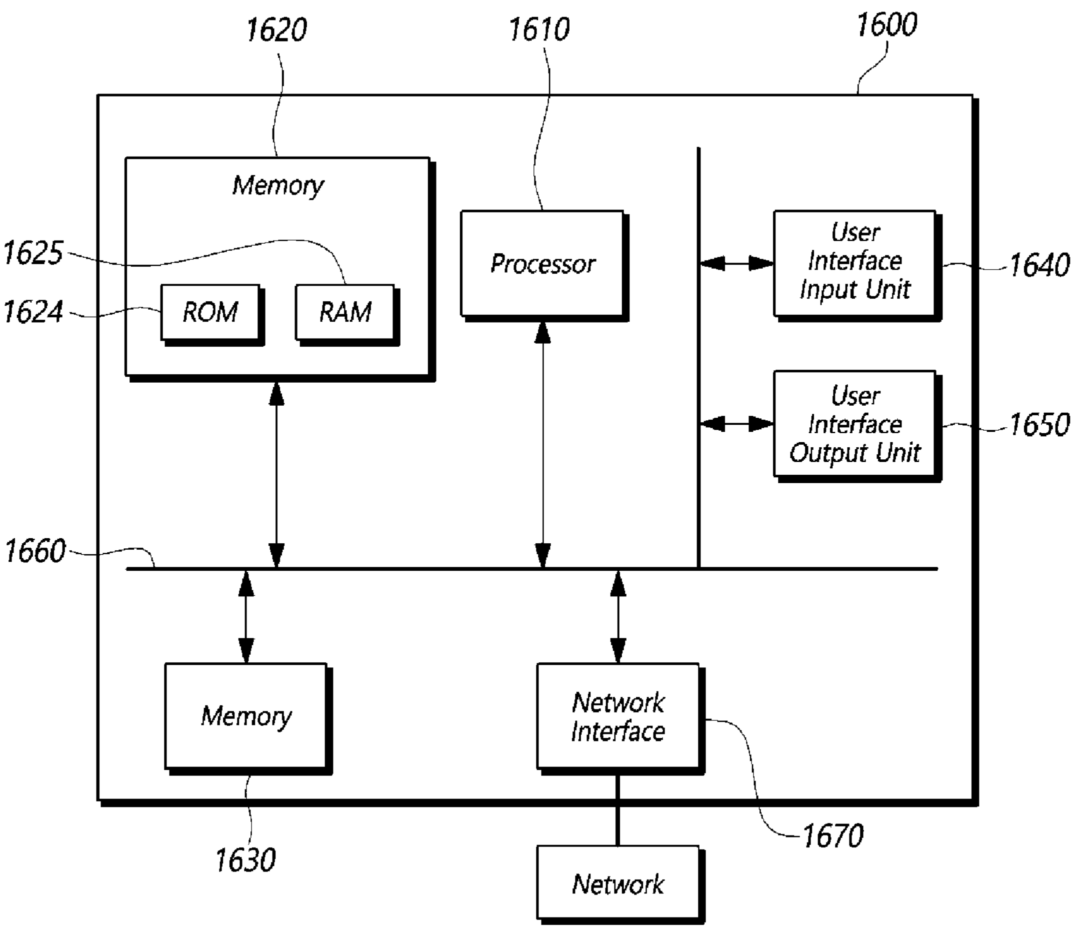
FIG. 16 illustrates an example of a hardware configuration of one or more components included in a radar system according to an embodiment of the present disclosure.

FIG. 16 illustrates an example of a hardware configuration of one or more components included in a radar system according to an embodiment of the present disclosure.

Referring to FIG. 16, a radar device and a device for processing a signal according to certain embodiments described above may be implemented with hardware or software implemented in a computer system or a controller.

For example, the transceiver 200, the signal processor 300, the pre-acquisition unit 310 and the normal-acquisition unit 320 included in a signal processor in the above-described radar device may be implemented as a computer device or a controller having hardware as shown in FIG. 16.

A computer system 1600 may be the radar device or system, the transceiver 200, and the signal processor 300 described above. The computer system 1600 may include one or more of one or more processors 1610, a memory 1620, a storage 1630, a user interface input unit 1640, and a user interface output unit 1650, and those elements may communicate with each other through a bus 1660.

In addition, the computer system 1600 may also include a network interface 1670 for connecting to a network. The processor 1610 may be a central processing unit (CPU) or a semiconductor device configured to execute processing instructions stored in the memory 1620 and/or the storage 1630. The memory 1620 and the storage 1630 may include various types of volatile and/or nonvolatile storage media. For example, the memory 1600 may include a read-only memory (ROM) 1624 and a random access memory (RAM) 1625.

In addition, one or more software modules performing functions of the pre-acquisition unit 310 and the normal-acquisition unit 320 which are processed or performed in the signal processor 300 may be installed in the computer system 1600.

Specifically, in the computer system 1600, a software module having a pre-acquisition function for processing the first signal during the first period to create a bin-reject mask, and another software module having a normal-acquisition function of acquiring and storing range FFT processing results using the bin-rejection mask during the second period, determining an accurate Doppler frequency in which the Doppler ambiguity is removed and estimating the angle of the target based on the determined Doppler frequency.

The processor 1610 of the radar device according to the present embodiment may execute the above-described software modules stored in the storage 1630 or the memory 1620 to perform a corresponding function.

As described above, a radar device and a device for processing a signal according to an embodiment of the present disclosure may reduce the required memory capacity by a pre-acquisition processing operation which creates a bin-rejection mask to exclude range sections without velocity components.

In addition, a radar device and a device for processing a signal according to an embodiment of the present disclosure may include a normal-acquisition processing step for changing the pulse-repetition interval within one scan period, thereby reducing the Doppler ambiguity and estimating an accurate target angle.

It should be noted that although all or some of the configurations or elements included in one or more of the embodiments described above have been combined to constitute a single configuration or component or operated in combination, the present disclosure is not necessarily limited thereto. That is, within the scope of the object or spirit of the present disclosure, all or some of the configurations or elements included in the one or more of the embodiments may be combined to constitute one or more configurations or components or operated in such combined configuration (s) or component(s). Further, each of the configurations or elements included in one or more of the embodiments may be implemented by an independent hardware configuration; however, some or all of the configurations or elements may be selectively combined and implemented by one or more computer program(s) having one or more program module (s) that perform some or all functions from one or more combined hardware configuration(s). Codes or code segments constituting the computer program(s) may be easily produced by those skilled in the art. As the computer programs stored in computer-readable media are read and executed by a computer, embodiments of the present disclosure can be implemented. The media for storing computer programs may include, for example, a magnetic storing medium, an optical recording medium, and a carrier wave medium.

Furthermore, unless otherwise specified herein, terms 'include', 'comprise', 'constitute', 'have', and the like described herein mean that one or more other configurations or elements may be further included in a corresponding configuration or element. Unless otherwise defined herein, all the terms used herein including technical and scientific terms have the same meaning as those understood by those skilled in the art. The terms generally used such as those defined in dictionaries should be construed as being the same as the meanings in the context of the related art and should not be construed as being ideal or excessively formal meanings, unless otherwise defined herein.

The above description has been presented to enable any person skilled in the art to make and use the technical idea of the present disclosure, and has been provided in the context of a particular application and its requirements.

Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A device for processing a radar signal, the device comprising:

one or more signal processors; and memory configured to store instructions which, when executed by the one or more signal processors, cause the one or more signal processors to perform operations comprising:

in a first period within one scan period, performing two fast Fourier transforms on a first signal, extracting peaks from the first signal, on which the two fast Fourier transforms are performed, by performing digital beamforming or non-coherent integration and peak extraction, and determining a bin-rejection mask based on the peaks extracted from the first signal; and in a second period after the first period within the one scan period, performing the two fast Fourier transforms on a second signal different from the first signal, using the bin-rejection mask, extracting peaks from the second signal, on which the two fast Fourier transforms are performed, by performing the digital beamforming or non-coherent integration and the peak extraction, determining a Doppler component of a target using the peaks extracted from the first signal and the second signal, determining a virtual channel vector based on the Doppler component of the target, and acquiring information associated with the target based on the virtual channel vector.

2. The device of claim 1, wherein the second signal has a second pulse-repetition interval different from a first pulse-repetition interval of the first signal.

3. The device of claim 2, wherein the one or more signal processors are configured to perform the peak extraction by a constant false alarm rate (CFAR) algorithm or a local-maximum algorithm.

4. The device of claim 3, wherein the bin-rejection mask represents a range section in which the Doppler component of the target exists.

5. The device of claim 1, wherein:

the first signal is an intermediate frequency signal acquired by mixing a first transmission signal transmitted from a first transmission antenna and a first reception signal reflected from the target and received from a plurality of reception antennas, and the second signal is an intermediate frequency signal acquired by mixing a second transmission signal transmitted from a second transmission antenna and a second reception signal reflected from the target and received from the plurality of reception antennas.

6. The device of claim 5, wherein the first transmission antenna and the second transmission antenna are configured to transmit the first transmission signal and the second transmission signal sequentially by time-division multiplexing, respectively.

7. The device of claim 5, wherein the one or more signal processors are configured to modulate the first transmission signal and the second transmission signal differently from each other by binary phase modulation.

8. The device of claim 5, wherein:

the first transmission signal and the second transmission signal are up-chirp signals, a number of the up-chirp signals corresponding to the first transmission signal during the first period is smaller than a number of the up-chirp signals corresponding to the second transmission signal during the second period.

9. The device of claim 8, wherein:

the two fast Fourier transforms include a range FFT and a Doppler FFT, and a size of the range FFT performed during the first period is larger than a size of the range FFT performed during the second period.

10. The device of claim 9, wherein the size of the range FFT performed during the second period is a size of a pass-bin determined based on the bin-rejection mask.

11. The device of claim 1, wherein the one or more signal processors are configured to, in the second period after the first period within the one scan period, select and store only data of a range having a Doppler component for each of chirp signals using the bin-rejection mask.

12. A method for processing a radar signal, the method comprising:

a pre-acquisition step performed during a first period within one scan period, the pre-acquisition step comprising performing two fast Fourier transforms on a first signal, extracting peaks from the first signal, on which the two fast Fourier transforms are performed, by performing digital beamforming or non-coherent integration and peak extraction, and determining a bin-rejection mask based on the peaks extracted from the first signal; and a normal-acquisition step performed during a second period after the first period within the one scan period, the normal-acquisition step comprising performing the two fast Fourier transforms on a second signal different from the first signal, using the bin-rejection mask, extracting peaks from the second signal, on which the two fast Fourier transforms are performed, by performing the digital beamforming or non-coherent integration and the peak extraction, determining a Doppler component of a target using the peaks extracted from the first signal and the second signal, determining a virtual channel vector based on the Doppler component of the target, and acquiring information associated with the target based on the virtual channel vector.

13. The method of claim 12, wherein the second signal has a second pulse-repetition interval which is different from a first pulse-repetition interval of the first signal.

14. The method of claim 13, wherein the bin-rejection mask represents a range section in which the Doppler component of the target exists.

15. The method of claim 12, wherein:

the first signal is an intermediate frequency signal acquired by mixing a first transmission signal transmitted from a first transmission antenna and a first reception signal reflected from the target and received from a plurality of reception antennas, and the second signal is an intermediate frequency signal acquired by mixing a second transmission signal transmitted from a second transmission antenna and a second reception signal reflected from the target and received from the plurality of reception antennas.

16. The method of claim 15, wherein:

the first transmission signal and the second transmission signal are up-chirp signals, a number of the up-chirp signals corresponding to the first transmission signal during the first period is smaller than a number of the up-chirp signals corresponding to the second transmission signal during the second period.

17. The method of claim 16, wherein:

the two fast Fourier transforms (FFTs) include a range FFT and a Doppler FFT, and a size of the range FFT performed during the first period is larger than a size of the range FFT performed during the second period.

18. The method of claim 17, wherein the size of the range FFT performed during the second period is a size of a pass-bin determined based on the bin-rejection mask.

19. The method of claim 12, wherein the normal-acquisition step comprises selecting and storing only data of a range having a Doppler component for each of chirp signals using the bin-rejection mask.

20. A radar system comprising:

an antenna unit including a transmission antenna unit including a first transmission antenna and a second transmission antenna and a reception antenna unit including a plurality of reception antennas;

a transceiver configured to transmit a transmission signal through the transmission antenna unit and receive a reception signal through the reception antenna unit; and one or more signal processors configured to estimate an angle of a target by processing the transmission signal and the reception signal, wherein the one or more signal processors are configured to:

in a first period within one scan period, perform two fast Fourier transforms on a first signal, extract peaks from the first signal, on which the two fast Fourier transforms are performed, by performing digital beamforming or non-coherent integration and peak extraction, and determine a bin-rejection mask based on the peaks extracted from the first signal; and in a second period after the first period within the one scan period, perform the two fast Fourier transforms on a second signal different from the first signal, using the bin-rejection mask, extract peaks from the second signal, on which the two fast Fourier transforms are performed, by performing the digital beamforming or non-coherent integration and the peak extraction, determine a Doppler component of a target using the peaks extracted from the first signal and the second signal, determine a virtual channel vector based on the Doppler component of the target, and acquire information associated with the target based on the virtual channel vector.

* * * * *